United States Patent Office 3,051,709
Patented Aug. 28, 1962

3,051,709
SUBSTITUTEDAMINO-3-(4- AND 5-INDANOXY)-PROPANE-2-OLS
Seymour L. Shapiro, Hastings on Hudson, and Louis Freedman, Bronxville, N.Y., assignors to U.S. Vitamin & Pharmaceutical Corporation, a corporation of Delaware
No Drawing. Filed Apr. 22, 1960, Ser. No. 23,910
6 Claims. (Cl. 260—268)

This invention is concerned with novel substitutedamino-3-(4- and 5-indanoxy-propane-2-ols which are substituted in the 3-position of the propane chain with a 4- or 5-indanoxy substituent, and in the 1-position of the propane chain with a substituted amino group, and which are represented by the following formulae:

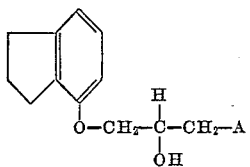

and

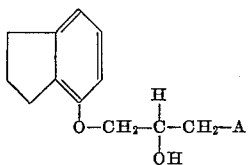

In these compounds A— is a secondary amino radical selected from the group consisting of piperidino, morpholino, pyrrolidino, (4-methyl)-piperazino, (4-hydroxyethyl)-piperazino, (4-phenyl)-piperazino, indolino and tetrahydroisoquinolino and $R_1R_2N$—, wherein $R_1$ is selected from the group consisting of alkyl, allyl, dialkylaminoalkyl, aralkyl, said aralkyl embodying such radicals as benzyl, d-α-methylphenethyl, pyridylethyl, and $R_2$ is selected from the group consisting of lower alkyl, allyl, and hydroxyethyl.

The hydroxyl-bearing carbon of the compounds of this invention is asymmetric and accordingly, the d, l forms of the compounds hereinafter described may be resolved by techniques familiar to those skilled in the art to yield the representative d and l forms from such racemates.

The compounds of this invention are basic and the invention also encompasses salts with mineral acids such as hydrochloric acid, sulfuric acid and the like, and with organic acids such as acetic acid, malic acid and theophylline. In addition, quaternary salts with agents such as methyl iodide, diethyl sulfate, ethyl bromoacetate and the like are within the purview of this invention.

The compounds herein described and claimed are useful pharmacological agents, particularly in their effects on the central nervous system, and show activity as anticonvulsant agents, central nervous depressants, analgesics, muscle relaxants, and as potentiators of barbiturates.

In addition, by virtue of the free functional hydroxyl group, the compounds of this invention can be converted to other derivatives of pharmacological importance; as for example, carbamates of the structure shown below:

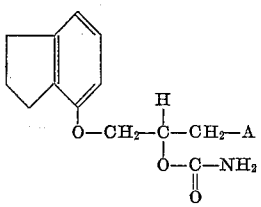

For the synthesis of the required compounds, the 4- or 5-indanol is condensed with epichlorohydrin in the presence of a basic binding agent such as potassium hydroxide, yielding the required 3-(4- or 5-indanoxy)-propylene oxide, as is shown below for the 5-isomer:

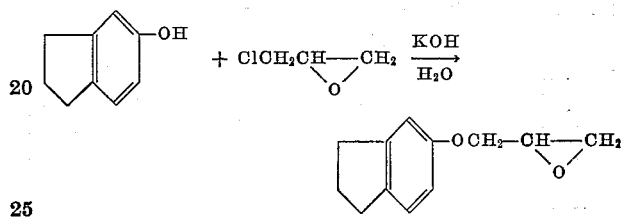

The requisite secondary amine AH, upon condensation with the 3-(4- or 5-indanoxy)-propylene oxide at elevated temperature then affords the 1-substituted amino-3-(4- or 5-indanoxy)-propane-2-ols of this invention.

The process for the compounds of this invention will be more clearly understood after consideration of the following specific examples which are given for the purposes of illustration only and are not to be construed as limiting the scope of the invention in any way.

EXAMPLE 1

1-(4-Methylpiperazino)-3-(4-Indanoxy)-Propane-2-Ol

A mixture of 1.5 g. (0.015 mole) of N-methylpiperazine and 1.9 g. (0.01 mole) of 3-(4-indanoxy)-propylene oxide in 6 ml. of heptane was heated in an oil bath, maintained at 100° for a period of 2 hours. When cool the reaction mixture was washed with 10 ml. of water, the heptane layer separated, the heptane removed, and on scratching, the oily residue solidified. There was obtained 1.95 g. (67.2%) of product, M.P. 83–86°. On recrystallization (hexane) there was obtained 1.55 g. (53%), M.P. 88–89°.

EXAMPLE 2

1-(N-Methylbenzylamino)-3-(4-Indanoxy)-Propane-2-Ol

In a manner similar to that described for Example 1 and using N-methylbenzylamine as the reactant amine there was obtained a residual oil which on distillation afforded 2.42 g. (52%) of product, B.P. 174–178° to (0.2 mm.).

EXAMPLE 3

1-(N-Methyl-2-[2-Pyridyl]Ethyl)Amino-3-(5-Indanoxy)-Propane-2-Ol

In a manner similar to that described for Example 1 and using N-methyl-2-(2-pyridyl)ethylamine and 3-(5-indanoxy)-propylene oxide, there was obtained 3.48 g. of liquid residue which was distilled to afford 2.45 g. of product, B.P. 170–182° (0.3 mm.).

EXAMPLE 4

In a manner similar to that described for Examples 1–3, typical products of this invention have been characterized and tabulated below:

$$\begin{array}{c}R_1\\ \phantom{R_1}\diagdown\\ \phantom{R_1R_2}N-CH_2-\underset{\underset{H}{|}}{\overset{\overset{OH}{|}}{C}}-CH_2-OH\\ \phantom{R_1}\diagup\\ R_2\end{array}$$

| No. | $R_1$ | $R_2$ | M.P.° C.[a][b] or B.P. (mm.) | Yield, percent | Formula | Analyses,[*] percent ||||||
|---|---|---|---|---|---|---|---|---|---|---|---|
| | | | | | | Carbon || Hydrogen || Nitrogen ||
| | | | | | | Calcd. | Found | Calcd. | Found | Calcd. | Found |
| | X=4-indanyl ||||||||||||
| 1 | —(CH$_2$)$_5$— || 60–61 | 15 | C$_{17}$H$_{25}$NO$_2$ | 74.1 | 74.1 | 9.2 | 9.3 | 5.1 | 4.7 |
| 2 | —(CH$_2$)$_2$—O—(CH$_2$)$_2$— || 158–164/0.3 | 49 | C$_{16}$H$_{23}$NO$_3$ | 69.3 | 68.7 | 8.4 | 7.9 | 5.1 | 5.1 |
| 3 | C$_3$H$_5$—[d] | C$_3$H$_5$—[d] | 139–145/0.2 | 67 | C$_{18}$H$_{25}$NO$_2$ | 75.2 | 75.1 | 8.8 | 8.9 | 4.9 | 5.2 |
| 4 | —(CH$_2$)$_2$N(CH$_3$)—(CH$_2$)$_2$— || 88–89 | 53 | C$_{17}$H$_{26}$N$_2$O$_2$ | 70.3 | 70.0 | 9.0 | 9.0 | 9.7 | 9.5 |
| 5 | —(CH$_2$)$_2$N(CH$_2$CH$_2$OH)—(CH$_2$)$_2$— || 184–190/0.2 | 20 | C$_{18}$H$_{28}$N$_2$O$_3$ | 67.5 | 67.8 | 8.8 | 8.6 | | |
| 6 | —(CH$_2$)$_2$N(C$_6$H$_5$)—(CH$_2$)$_2$— || 74–76 | 58 | C$_{22}$H$_{28}$N$_2$O$_2$ | 75.0 | 74.5 | 8.0 | 7.8 | 8.0 | 8.3 |
| 7 | C$_6$H$_5$CH$_2$— | CH$_3$— | 174–178/0.2 | 52 | C$_{19}$H$_{23}$NO$_2$ | 77.1 | 76.9 | 8.1 | 8.1 | | |
| 8 | C$_6$H$_5$CH$_2$— | HOCH$_2$CH$_2$— | 206–210/0.2 | 46 | C$_{21}$H$_{27}$NO$_3$ | | | | | 4.1 | 3.8 |
| 9 | d—C$_6$H$_5$CH$_2$CHCH$_3$— | CH$_3$— | 172–184/0.1 | 33 | C$_{22}$H$_{29}$NO$_2$ | 77.8 | 77.6 | 8.6 | 8.1 | 4.1 | 4.3 |
| 10 | —1,2—CH$_2$—C$_6$H$_4$—(CH$_2$)$_2$— || 104–106 | 49 | C$_{21}$H$_{25}$NO$_2$ | 78.0 | 77.5 | 7.8 | 7.4 | 4.3 | 4.2 |
| 11 | 4—Py(CH$_2$)$_2$—[e] | CH$_3$— | 186–208/0.2 | 33 | C$_{20}$H$_{27}$N$_2$O$_2$ | | | | | 8.6 | 9.0 |
| | X=5-indanyl ||||||||||||
| 12 | —(CH$_2$)$_5$— || 135–141/0.2 | 47 | C$_{17}$H$_{25}$NO$_2$ | 74.1 | 74.2 | 9.2 | 9.4 | | |
| 13 | C$_3$H$_5$—[d] | C$_3$H$_5$—[d] | 140–148/0.3 | 41 | C$_{18}$H$_{25}$NO$_3$ | | | | | 4.9 | 4.7 |
| 14 | (CH$_3$)$_2$N—(CH$_2$)$_2$— | CH$_3$— | 134–142/0.2 | 39 | C$_{17}$H$_{28}$N$_2$O$_2$ | 69.8 | 69.9 | 9.7 | 9.3 | 9.6 | 9.7 |
| 15 | —(CH$_2$)$_2$NCH$_3$—(CH$_2$)$_2$— || 165–168/0.2 | 46 | C$_{17}$H$_{26}$N$_2$O$_2$ | 70.3 | 70.4 | 9.0 | 8.7 | 9.7 | 9.8 |
| 16 | —(CH$_2$)$_2$N(CH$_2$CH$_2$OH)—(CH$_2$)$_2$— || 180–184/0.2 | 36 | C$_{18}$H$_{28}$N$_2$O$_3$ | | | | | 8.8 | 8.7 |
| 17 | C$_6$H$_5$CH$_2$— | CH$_3$— | 168–174/0.2 | 53 | C$_{20}$H$_{25}$NO$_2$ | 77.1 | 77.2 | 8.1 | 7.8 | 4.5 | 4.6 |
| 18 | d—C$_6$H$_5$CH$_2$CHCH$_3$— | CH$_3$— | 156–160/0.1 | 46 | C$_{22}$H$_{29}$NO$_2$ | 77.8 | 77.6 | 8.6 | 8.8 | 4.1 | 4.0 |
| 19 | —1,2—CH$_2$C$_6$H$_4$—(CH$_2$)$_2$— || 61–63 | 29 | C$_{21}$H$_{25}$NO$_2$ | 78.0 | 77.7 | 7.8 | 8.1 | 4.3 | 4.4 |
| 20 | 2—Py(CH$_2$)$_2$—[e] | CH$_3$— | 170–182/0.3 | 50 | C$_{20}$H$_{26}$N$_2$O$_2$ | | | | | 8.6 | 8.8 |
| 21 | 4—Py(CH$_2$)$_2$—[e] | CH$_3$— | 168–185/0.2 | 37 | C$_{20}$H$_{27}$N$_2$O$_2$ | 73.4 | 72.5 | 8.3 | 8.3 | 8.6 | 8.7 |

[a] Melting points are not corrected. [b] The solids were recrystallized from hexane.
[c] Analyses by Weiler and Strauss, Oxford, England. [d] C$_3$H$_5$— is allyl. [e] Py is pyridyl.

EXAMPLE 5

3-(5-Indanoxy)-Propylene Oxide

A mixture of 134.2 g. (1 mole) of 5-indanol, 101.6 g. (1.1 mole) of epichlorohydrin and 67.3 g. (1.2 mole) of potassium hydroxide in 1 l. of water was stirred at 25° for 24 hours. The formed oil was extracted with four 200-ml. portions of chloroform, the chloroform extract washed with water, the chloroform removed and the residue distilled. The product was obtained, 96.0 g. (51%), B.P. 94–104° (0.4 mm.).

*Analysis.*—Calcd. for C$_{12}$H$_{14}$O$_2$: C, 75.8; H, 7.4; mol. wt., 190.2. Found: C, 76.5; H, 7.9; mol. wt., 194.0.

EXAMPLE 6

3-(4-Indanoxy)-Propylene Oxide

A mixture of 134.2 g. (1 mole) of 4-indanol, 101.6 g. (1.1 mole) of epichlorohydrin and 67.3 g. (1.2 mole) of potassium hydroxide was stirred at 25° for 24 hours. The formed oil was extracted with three 200-ml. portions of chloroform, the chloroform extract washed with water, the chloroform removed and the residue distilled. The product was obtained, 131 g. (69%), B.P. 78–100° (0.1–0.2 mm.).

*Analysis.*—Calcd. for C$_{12}$H$_{14}$O$_2$: C, 75.8; H, 7.4. Found: C, 75.7; H, 7.1.

It is to be understood that it is intended to cover all changes and modifications of the examples herein chosen for the purposes of illustration which do not constitute departure from the spirit and scope of the invention.

We claim:

1. A composition of matter selected from the group consisting of 1-substituted amino-3-(4- and 5-indanoxy)-propane-2-ols, said 1-substituted amino-3-(4- and 5-indanoxy)-propane-2-ols having the structure

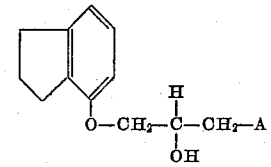

and

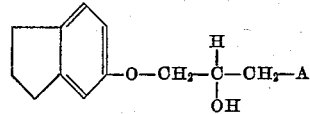

wherein A— is a secondary amino radical selected from the group consisting of piperidino, morpholino, pyrrolidino, (4-methyl)-piperazino, (4-hydroxyethyl)-piperazino, (4-phenyl)-piperazino, indolino, tetrahydroisoquinolino and R$_1$R$_2$N, wherein R$_1$ is selected from the group consisting of methyl, ethyl, allyl, benzyl, α-methylphenylethyl, pyridylethyl, dimethylaminoethyl and dimethylaminopropyl and R$_2$ is selected from the group consisting of methyl, ethyl, allyl, and hydroxyethyl.

2. The compound

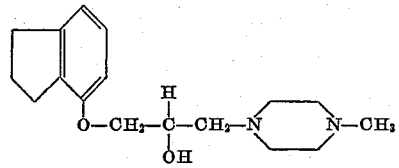

3. The compound
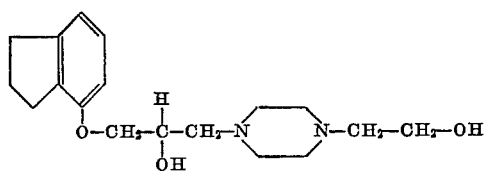
4. The compound
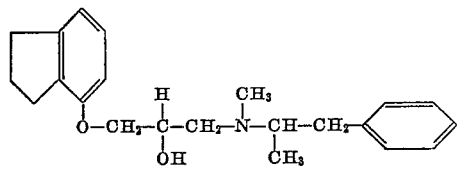
5. The compound
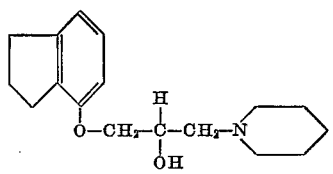
6. The compound
References Cited in the file of this patent
UNITED STATES PATENTS
| | | |
|---|---|---|
| 2,441,069 | Hoffman et al. | May 4, 1948 |
| 2,681,932 | Dornfeld et al. | June 22, 1954 |
| 2,820,817 | Sam | Jan. 21, 1958 |